N. W. FINCH.
DRAFT EQUALIZER.
APPLICATION FILED SEPT. 23, 1912.

1,061,365.

Patented May 13, 1913.

Witnesses

N. W. Finch
Inventor,
by C. A. Snow & Co.
Attorneys.

UNITED STATES PATENT OFFICE.

NATHAN W. FINCH, OF PLANO, ILLINOIS.

DRAFT-EQUALIZER.

1,061,365.   Specification of Letters Patent.   Patented May 13, 1913.

Application filed September 23, 1912. Serial No. 721,930.

*To all whom it may concern:*

Be it known that I, NATHAN W. FINCH, a citizen of the United States, residing at Plano, in the county of Kendall and State of Illinois, have invented a new and useful Draft-Equalizer, of which the following is a specification.

This invention relates to draft equalizers, and aims to provide a novel and improved draft equalizer adapted for the attachment of a plurality of draft animals, and operable to evenly distribute the draft among the several animals without creating any excessive side draft.

With the foregoing and other objects in view, which will be apparent as the invention is better understood, the present invention resides in the novel construction, arrangement and combination of parts herein-after set forth, it being understood that this device is susceptible of alterations and deviations in its details within the scope of the appended claim without departing from the spirit of the invention.

The invention has been illustrated in its preferred embodiment in the accompanying drawings, wherein like references have been employed to denote corresponding parts and wherein:—

Figure 1:
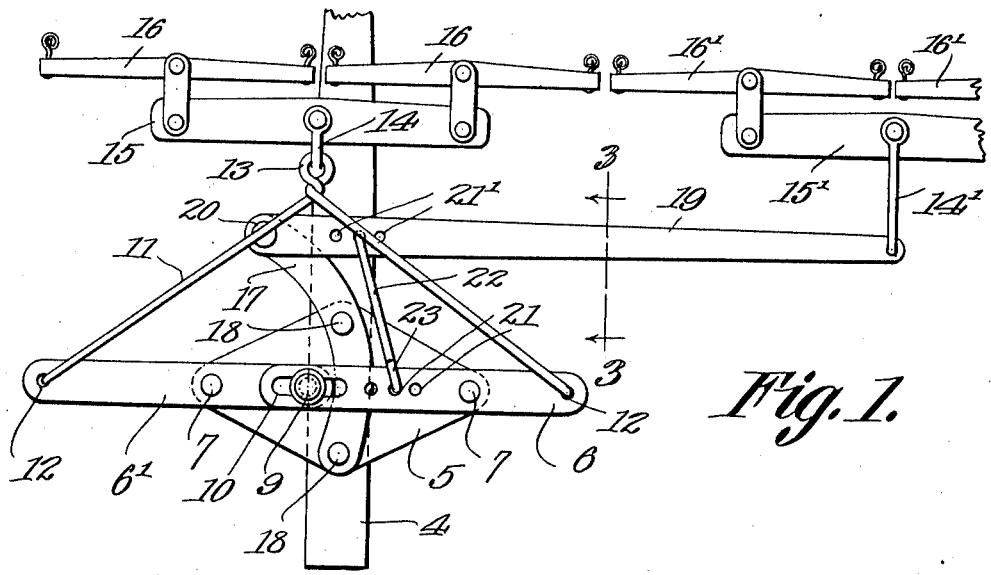
Figure 2:
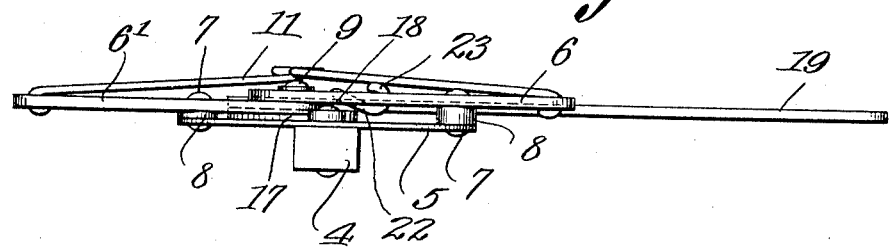
Figure 3:
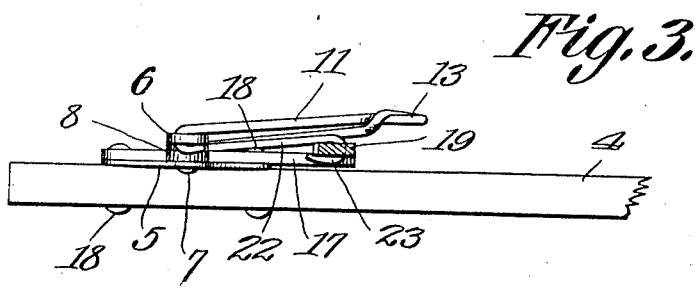

Figure 1 is a plan view of the draft equalizer, parts being broken away. Fig. 2 is a rear elevation thereof, parts being removed. Fig. 3 is a sectional detail taken on the line 3—3 of Fig. 1, parts being removed.

Referring specifically to the drawings, the numeral 4 designates a tongue, which is connected to the vehicle, plow or the like in the usual manner. On the tongue 4 is secured a plate 5, which projects laterally toward both sides, the said plate being of diamond shape.

A pair of levers 6—6' are fulcrumed to the lateral extremities of the plate 5 by means of rivets or other securing members 7, the said levers being spaced above the plate 5 by means of washers 8 on the rivets 7. The inner end of the lever 6 is provided with an elongated slot 10, and the inner end of the lever 6' carries a member 9 working in the slot 10, so that the inner ends of the levers are operatively connected for sliding movements.

A V-shaped draft member or rod 11 has the ends of its arms hooked through apertures 12 provided in the outer ends of the levers 6—6', and the said draft member is twisted at its crotch to provide an eye 13 through which the clevis 14 of the whiffle tree 15 is engaged. A pair of swingle trees 16 are connected to the whiffle tree 15 for the attachment of horses or other draft animals.

A laterally projecting arm 17 is secured to the tongue preferably by the securing members 18 which secure the plate 5 to the tongue, the arm 17 projecting toward the side at which the lever 6' is arranged.

An equalizing lever 19 is fulcrumed to the free end of the arm 17 by means of the rivet, bolt or other securing member 20, and to the free or outer end of the lever 19 is connected a whiffle tree 15' by means of a clevis 14', the whiffle tree 15' having a pair of swingle trees 16' attached thereto. The lever 19 projects toward the other side of the tongue, on the side at which the lever 6 is arranged. The equalizing lever 19 is operatively connected to the inner ends of the levers 6—6' by means of a link 22. The lever 6 is provided with a series of apertures 21 adjacent its inner end, while the equalizing lever 19 is provided with a similar series of apertures 21' adjacent the fulcrum thereof, the link 22 having hooks 23 at its end engageable through one of the apertures of each series.

The number of swingle trees connected to the respective whiffle trees may be varied according to the circumstances, as will be apparent.

In use, it will be noted that the draft created by the animals attached to one whiffle tree is pitted against the draft created by the draft animals attached to the other whiffle tree, so that the draft will be equalized between the two sets of animals, By the particular combination of component parts as set forth, the draft will be exerted practically direct on the tongue 4, so as to avoid any excessive side draft. The objects aimed at are thus attained in a simple, inexpensive and efficient manner.

It will be observed that when the outer ends of the levers 6 and 6' are swung forwardly and rearwardly, the arms of the V-shaped rod 11 will be flexed inwardly or toward each other, the crotch of the said rod being rigid. It is natural that when the arms of the said rod are flexed inwardly or toward each other, they will be brought under tension, so that when all of the levers are free, they will be returned to normal or neutral position due to the tension of the said rod. Thus, the arms of the said rod may even normally have a spreading or separating tendency so as to more effectively return the levers to their normal position when free. In all events, the flexibility or resiliency of the arms of the V-shaped rod 11 will tend to maintain the levers 6 and 6' in normal or alining position, as shown in Fig. 1. This is of advantage for reason that should the traces be slackened, all of the levers will return to normal position, so that the swingletrees are in alinement, thereby eliminating the liability of the levers and swingletrees to swing at random, which would be objectionable for obvious reasons.

Having thus described the invention, what is claimed is:

A draft equalizer embodying a pair of levers operatively connected at their inner ends, a V-shaped rod connected at its ends to the outer ends of the levers and having its crotch rigid and twisted into an eye so that the arms may be flexed as the levers are swung and in order to tend to maintain the levers in alinement, an equalizing lever, a link connecting the equalizing lever and one of the former levers, and whiffletrees connected to the said eye and equalizing lever.

In testimony that I claim the foregoing as my own, I have hereto affixed my signature in the presence of two witnesses.

NATHAN W. FINCH.

Witnesses:
 HENRY FINCH,
 J. N. SHELTON.

Copies of this patent may be obtained for five cents each, by addressing the "Commissioner of Patents Washington, D. C."